Jan. 19, 1932.    T. R. HARRISON    1,842,371
CONTROL INSTRUMENT SWITCH
Original Filed Nov. 13, 1925    2 Sheets-Sheet 2
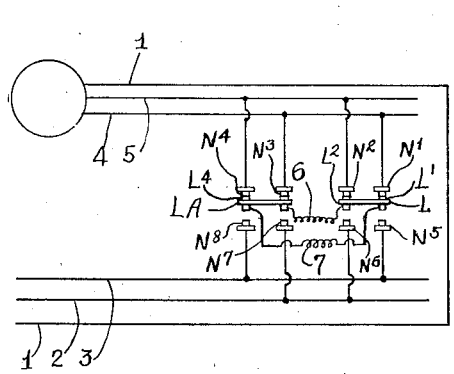
Fig.3,
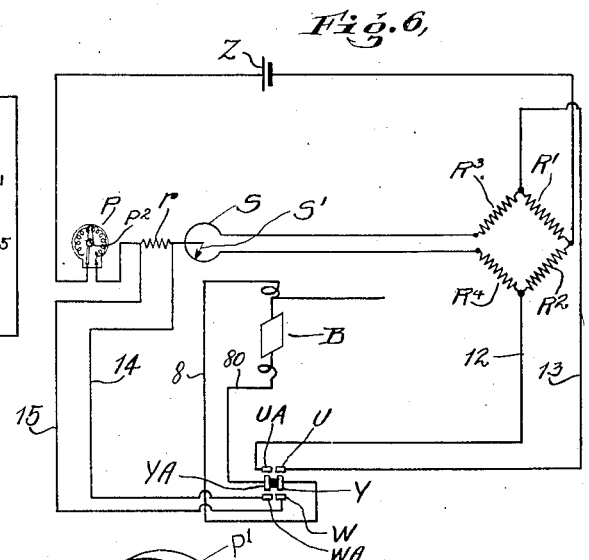
Fig.6,
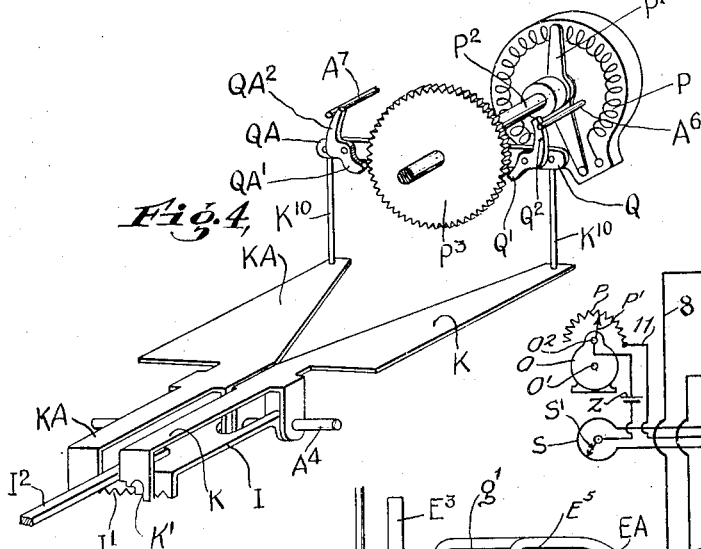
Fig.4,    Fig.5,
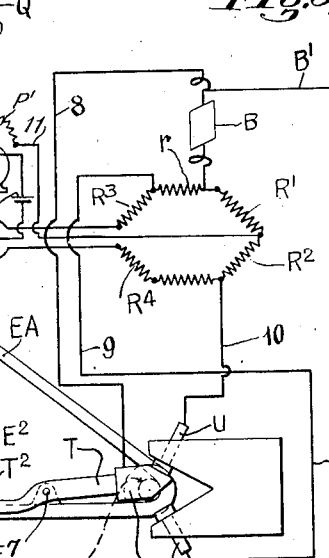
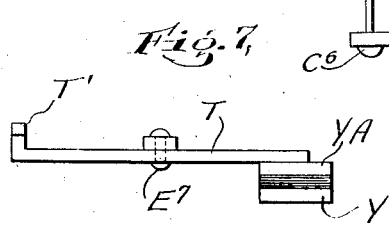
Fig.7,
INVENTOR
THOMAS R. HARRISON
BY
John E. Hubbell
ATTORNEY Patented Jan. 19, 1932

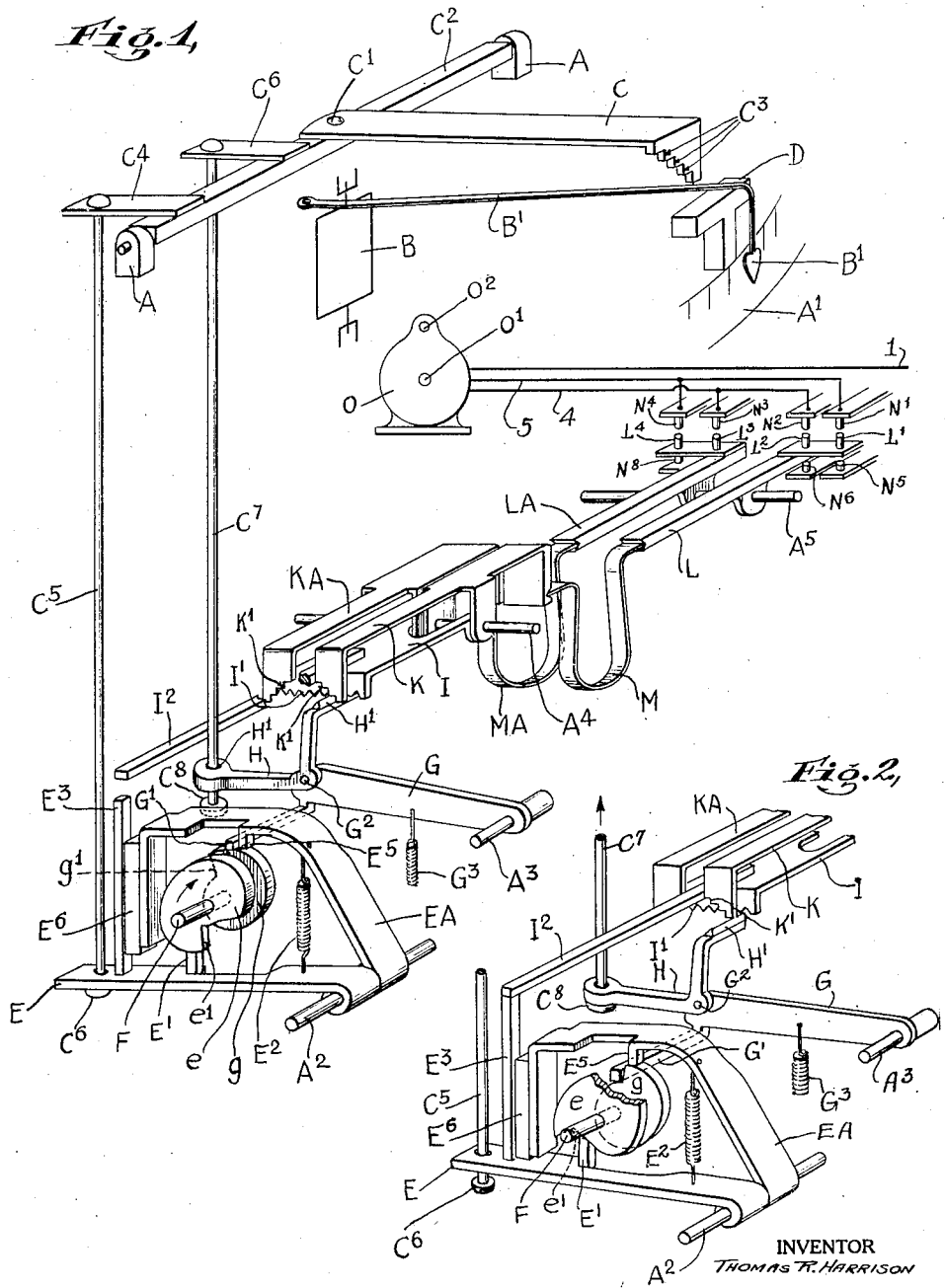

1,842,371

UNITED STATES PATENT OFFICE

THOMAS RANDOLPH HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

CONTROL INSTRUMENT SWITCH

Application filed November 13, 1925, Serial No. 68,927. Renewed February 13, 1931.

The general object of the present invention is to provide improved mechanism of the type in which a sensitive meter is employed to selectively actuate a relay mechanism through which said meter adjusts or controls one or more instrumentalities such as a potentiometer or Wheatstone bridge resistance, a recording mechanism, signal lamps, a relay motor, and analogous devices.

In its preferred form, the improved mechanism as a whole is characterized by the fact that the meter pointer directly controls the engaging position of an element periodically brought into contact with the pointer, and that the position of said element when in contact with the pointer is effected rather than the contact itself, or force transmitted through the pointer controls the operation of a secondary selective relay mechanism through which the ultimate control function is directly exercised. By the use of a relay selectively controlled and selectively operating in accordance with the present invention, I attain certain important secondary objects of the invention, such as a reduction in the force to which the meter is subjected in its control of the primary selector, thereby permitting of the effective use of a relatively simple and sensitive meter and primary selector mechanism. The use of said relay mechanism also makes it possible to remove the electrical control circuit connections and contacts from proximity to the moving element or pointer of the meter. The use of said relay mechanism also makes it possible to have the meter pointer restrained from free movement by the operation of the selective mechanism for very short periods of time, and permits the secondary selective mechanism to operate and perform its control functions during periods in which the meter pointer is unrestrained. The fact that the secondary selective mechanism may operate during periods in which the meter pointer is free decreases the required speed of operation of such mechanism so that effective operation may be secured with a relatively low powered and inexpensive relay motor. The use of primary and secondary selective mechanisms and the resultant simplification in the selective mechanism directly actuated by the meter, makes it readily possible to employ a control mechanism in which the exercise of the control function is dependent through a considerable range on the extent, as well as the direction of the pointer deflection of the control meter.

In the preferred construction embodying the present invention illustrated in the drawings hereof, I employ a meter pointer engaging member having a pointer engaging surface inclined to the plane of pointer deflection so that the position of said member depends upon the deflection of the pointer on each engagement of the latter with the pointer. In conjunction with this member I employ a relay mechanism selectively dependent upon the position of said member when in engagement with the pointer and serving to exert a controlling effect dependent, as to its direction, and preferably as to its magnitude also, on the portion of said surface in contact with the pointer when the latter is engaged by said member. The use of a pointer engaging member having an inclined pointer engaging surface in the combination described contributes to a desirable simplicity in construction and operation of an instrument adapted for the attainment of the objects and advantages herein referred to.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is a diagrammatic illustration of a control meter and associated relay mechanism;

Fig. 2 is a perspective view of a portion of the mechanism shown in Fig. 1 with parts in different relative positions;

Fig. 3 is a diagram of the control circuits for the selectively controlled motor shown in Fig. 1;

Fig. 4 is a perspective view illustrating a modified form of control mechanism;

Fig. 5 is a diagrammatic illustration of a Wheatstone bridge controlled by the mechanism of Fig. 1;

Fig. 6 is a diagram illustrating a modification of the apparatus shown in Fig. 5; and Fig. 7 is a plan view of a detail of the mechanism employed in Fig. 6.

In the drawings, and referring first to the construction of Figs. 1 and 2, B represents a milli-volt meter or other control meter, and B' the swinging pointer carried by the movable element of the meter B. The pointer B' is intermittently engaged by and arrests the downward movement of a pointer engaging element or member shown as an arm C pivotally connected at C' to a rock shaft $C^2$ which has its ends journalled in the meter framework A. A stationary stop D assists the pointer B' in arresting the downward movement of the arm C. The oscillatory movements of the rock shaft $C^2$ in its bearings are effected and controlled by means of a crank arm extension $C^4$ of the rock shaft $C^2$, and a depending rod or link $C^5$ pivotally connected at its upper end to the arm $C^4$ and having its lower end passing through an opening in the end of a lever E and provided with an enlargement $C^6$ engaged by the lever E when the latter is depressed. The pointer engaging surface of the arm C is inclined to the plane of deflection of the pointer so that the extent of movement of the arm toward the pointer occurring before the latter is engaged by the arm depends upon the deflection of the pointer which determines the portion of said inclined surface coming into engagement with the pointer. In the particular construction illustrated, the said inclined pointer engaging surface of the arm C is broken up into a series of steps or notches $C^3$. As hereinafter explained, the controlling effect produced by the engagement of the arm C with the pointer varies in direction and in magnitude according to the particular portion of said inclined surface then in contact with the pointer.

The lever E is pivotally connected to the instrument framework, as by means of the pivot pin $A^2$, and is given oscillatory movements about the latter by a cam e carried by a shaft F. The latter is continuously rotated by a clock or other suitable form of motor. The peripheral edge of the cam e bears, except during brief intervals, against a cam engaging portion E' of the lever E, and thereby holds the rod $C^5$ in the position shown in Fig. 1, in which the pointer engaging step portions $C^3$ of the member arm C are above the pointer, and the latter is free to swing in response to the current flow through the winding of the meter. Once in each rotation of the shaft F, the cam engaging portion E' enters a notch e' in the cam e. When this occurs, the lever E is swung upward by a spring $E^2$, thus permitting the rod $C^5$ to lift, and gravity then depresses the free end of the member arm C until one or another of its notches or steps $C^3$ engages the pointer B, and carries the latter down into engagement with the stop D. The extent of angular movement given to the rock bar $C^2$ when the member C falls, depends upon which of the steps $C^3$ engages the pointer B, since the turning movement of the rock bar $C^2$ is arrested by the pointer B as soon as the latter engages the stop D. A small fraction of a turn of the shaft F, after the lever E is thus permitted to rise, is sufficient to move the cam notch e' past the cam engaging portion of the lever E, and thereby ensure the return of the lever E to the position shown in Fig. 1.

A second cam g, carried by the shaft F, gives movement to a lever G pivotally connected to the framework of the instrument as by the pivot shaft $A^3$ and provided at its under side with a cam engaging projection G' which rides on the periphery of the cam g. Pivotally connected to the lever G as by means of the pivot pin $G^2$, is a member H shown as a bell crank lever. The free end of one arm of the lever H is shaped to provide a sort of a gear tooth H' parallel to the pivot pin $G^2$, and the other arm of the member H is operatively related with the rock bar $C^2$, so as to control the angular position of the member H with respect to the pivot pin $G^2$, as hereinafter described. In the form shown, the connection between the member H and the rock bar $C^2$ comprises a depending rod $C^7$ pivotally connected at its upper end to an arm $C^6$ carried by the rock bar $C^2$, and having its lower end passing loosely through an opening in the member H and provided beneath the latter with an enlargement $C^8$ adapted to engage the under side of the member H.

The cams e and g are so relatively disposed on the shaft F that shortly after the projection E' of the lever E enters the cam notch e', the projection G' of the lever G enters the cam notch g' of the cam g, thereby permitting the free end of the lever G to descend under the action of gravity and the pull of a spring $G^3$ the lower end of which is anchored to the instrument frame-work. Normally, and during the initial portion of the down movement of the lever G, the tooth H' of the member H is entered in one or another of a series of notches I' formed in the under side of a lever or keeper I pivotally connected to the instrument framework as by means of a pivot pin $A^4$. As the downward movement of the lever G continues, a projection $I^2$ from the member I engages a step $E^3$ carried by the lever E, the latter being then in its elevated position.

When this engagement occurs and the downswinging movement of the member I is arrested, the tooth H' passes out of engagement with the notch I' in which it was previously entered. The member H then tilts about the pivot pin $G^2$ under the action of gravity until the end of the member surrounding the rod $C^7$ engages the stop $C^8$ carried at the lower end of the rod. When the projection G' reaches the bottom of the cam notch g', the angular position of the member H with respect to the pivot $G^2$ is determined by the elevation of the rod $C^7$, and the latter depends in turn on which of the steps $C^3$ of the member C is in engagement with the meter pointer.

The parts are proportional so that the free end of the lever E has a greater vertical movement than the maximum movement of the rod $C^5$. In consequence the initial downward movement of the member E as the projection E' moves out of the bottom of the cam notch e', does not move the rock bar $C^2$ but does lower the stop $E^3$ and thereby the member I until the tooth H' of the member H is again entered in one of the notches I'. In the mechanism shown, the sole purpose of the member I is to lock the member H in the angular position of the latter with respect to the pivot pin $G^2$ determined by the elevation of the stop $C^8$ whenever the lever projection G' drops into the cam notch g'.

To expedite and control the movements of the lever E, I may advantageously provide an auxiliary lever EA, which, as shown, is fulcrumed on the pivot pin $A^2$ and is adapted to be raised and lowered by the cam g. As shown, the lever EA has a projection $E^5$ riding on the periphery of the cam g back of the projection G' and entering the cam notch g' shortly after the projection G' enters that notch. The lever EA carries a weighted projection $E^6$ against which lever E is brought to rest when projection E' is drawn into notch e' by spring $E^2$. When thus held together levers E, EA, and weight $E^6$ form a unit pivoted on shaft $A^2$ and initially supported by the projection $E^5$ resting against the face of cam g and in turn supporting the part $I^2$ through the part $E^3$. When projection $E^5$ enters the cam notch g', as stated above, parts E, EA, $E^6$, and $E^3$ descend until arrested by the stop $C^6$ on rod $C^5$. During this descent, the part $I^2$ follows part $E^3$ until the part H' engages the teeth I'. As the lever E engages the stop $C^6$ on rod $C^5$, the weight thus applied to rod $C^5$ counter-balances the rock bar $C^2$ and causes the arm C to be lifted from contact with pointer B'. This weight may be proportioned to raise C gently and to avoid an objectionable throw of pointer B' when the latter is set free. With the spring $E^2$, connected between the levers E and EA, as described, the tension of the spring $E^2$ does not retard the downward movement of the lever E occurring after the projection $E^5$ enters cam notch g'. The member H forms the selector element of the secondary selective mechanism, and the selective angular setting of the member H by the primary selector mechanism in response to the position of the meter pointer B', which occurs after each depression of the bar $C^2$, determines the subsequent adjustment of the mechanism controlled by the meter B.

In the apparatus shown in Figs. 1, 2, 3, and 4, the mechanism selectively controlled by the member H, according to the angular position in which the latter is locked by the member I, comprises a pair of levers K and KA. The latter, as shown, are fulcrumed on the pivot pin $A^4$ and are provided at their free ends with a series of steps K', one or another of which is engaged by the tooth H' of the member H when the latter is raised by the cam g, dependent upon which of the notches I' receives the tooth H', except when the latter is in an intermediate or neutral position in which the tooth H' passes between the members K and KA as the member H is raised by the cam g. The steps K' of the members K and KA are so shaped that the angular movement given to either member K or KA when one of its steps K' is engaged by the tooth H' will be greater or less, according as the step K' engaged is at a greater or less distance from the neutral position of the tooth.

The levers K and KA, which are thus selectively tilted about their supporting axis to a greater or less extent according to the position of the pointer B, may be employed to control the actuation of a potentiometer measuring instrument and/or various other instrumentalities which it is desirable to subject to automatic control. For example, as shown in Fig. 1, the levers K and KA actuate a switch mechanism to control the energization of a reversible motor O which may be employed to adjust a potentiometer in which the winding of the meter B is connected, or to control the heat supply to a furnace, the steam supply to a turbine, or generally, to perform a relay function in any control system of which the instrument shown forms a part. The particular switch mechanism shown in Fig. 1 comprises switch members L and LA fulcrumed on a shaft $A^5$ and connected to the members K and KA respectively, by toggle springs M and MA. When the member K is not operatively engaged by the tooth H' it is held by gravity or by a spring (not shown) with its end carrying the steps K' depressed, so that the toggle spring M then holds the adjacent end of the member L in a depressed position. When the step carrying end of the member K is raised by the tooth H' to a certain intermediate position, the line of action on the switch member L of the toggle spring M shifts from one side to the other of the axis of the shaft $A^5$, with the result that the switch member L snaps from one position in which its toggle spring end is relatively low, to a second position in which that end is higher.

The point in the revolution of the shaft F at which the switch member L is thus angularly adjusted on the shaft $A^5$ depends upon which step K' of the member K is then engaged by the tooth H'. When the tooth H' is close to its neutral position and engages a step K' which is close to the bar $I^2$, the member G must be elevated higher by the cam F to actuate the switch member L than when the tooth H' engages a step K' more remote from the member $I^2$. With a cam $g$ of suitable contour, the elevation of the member G, and thereby of the tooth H', proceeds progressively as the cam F rotates from the position in which the projection $G^2$ drops into the cam notch $g'$. The time interval in which the end of the switch member L engaged by the spring M is raised on each such depression is equal, therefore, to the time required for the cam $g$ to rotate from the position in which the elevation of the tooth H' is sufficient to elevate the adjacent end of the member L, into the position in which the projection $G^1$ re-enters the cam notch $g'$. When this occurs the tooth H' and adjacent end of the member K drop, and the spring M thereupon depresses the adjacent end of the switch member L. The switch member LA is actuated through the spring member MA and member KA in exactly the same manner as the switch member L is actuated through the spring M and member K.

The switch members L and LA actuated in the manner described in response to the varying position of the meter pointer B' may control the energization of the reversible motor O, or other device thereby controlled, in various ways. In the arrangement illustrated by way of example in Fig. 3, the motor O shown is a multiphase motor operated from multiphase supply conductors 1, 2, and 3. One terminal of the motor is shown as directly connected to the supply conductor 1, and the switch members L and LA serve to connect the supply conductor 2 to a second motor terminal 4, and to connect the supply conductor 3 to a third motor terminal 5 when the motor is to turn in one direction; and when the motor is to turn in the opposite direction, the switch members L and LA connect the supply conductors 2 and 3 to the motor terminals 5 and 4, respectively; and when the motor is to stand idle, the switch members L and LA occupy positions in which neither supply conductor 2 nor 3 is connected to either motor terminal 4 or 5. For the purposes just stated, the switch member L is provided with two contacts L' and $L^2$ which engage lower spring contact fingers $N^5$ and $N^6$ respectively, when the spring M elevates the end of the member L connected to the spring, and when the last mentioned end of the member L is depressed, as it is when the member K is not operatively engaged by the tooth H', the contacts L' and $L^2$ engage upper spring contact fingers N' and $N^2$. Similarly, the switch member LA carries contacts $L^3$ and $L^4$ which, when elevated, engage spring contact fingers $N^3$ and $N^4$ respectively, and when lowered, engage lower spring contact fingers $N^7$ and $N^8$. The contacts $L^2$ and $L^3$ are electrically connected as by means of a flexible conductor 6, and the contacts L' and $L^4$ are connected as by a flexible conductor 7. The upper contact fingers N' and $N^3$ are connected to the motor terminal 4, and the upper contact fingers $N^2$ and $N^4$ are connected to the motor terminal 5. The lower contact fingers $N^5$ and $N^8$ are connected to the supply conductor 3, and the lower contact fingers $N^6$ and $N^7$ are connected to the supply conductor 2.

With the circuit arrangement shown in Fig. 3, when the member K is tilted by the tooth H', thereby depressing the contacts L' and $L^2$ into engagement with the contact fingers $N^5$ and $N^6$ respectively, the conductor 2 is connected to the motor terminal 4 through contact finger $N^6$, contact $L^2$, flexible conductor 6, contact $L^3$, and contact finger $N^3$, while the supply conductor 3 is connected to the motor terminal 5 through contact finger $N^5$, contact L', flexible conductor 7, contact $L^4$, and contact finger $N^4$. This causes the motor O to rotate in a direction which, in any regulating system in which the invention will ordinarily be employed will be such as to tend to restore the pointer B', and thereby the tooth H', each to its neutral or intermediate position. When the tooth H' engages the member KA and thereby depresses the contacts $L^3$ and $L^4$ into engagement with the contact fingers $N^7$ and $N^8$ respectively, the supply conductor 2 is connected to the motor terminal 5 through contact finger $N^7$, contact $L^3$, flexible conductor 6, contact $L^2$, and contact finger $N^2$, while at the same time the supply conductor 3 is connected to the motor terminal 4 through contact finger $N^8$, contact $L^4$, flexible conductor 7, contact L', and contact finger N'.

A special advantage of the switch mechanism described is that the switch members L and LA cannot be accidentally adjusted into positions in which the supply conductors are short circuited, since when all four contacts L', $L^2$, $L^3$, and $L^4$ are simultaneously elevated or depressed, the supply conductors 2 and 3 are both disconnected from the motor winding and no circuit is closed.

In the modification illustrated in Fig. 4, the members K and KA mechanically actuate the switch arm P' of a rheostat P. To this end, the shaft $P^2$ carrying the switch arm P', also carries a ratchet disk $P^3$. Associated with the disk $P^3$ are rocker arms Q and QA respectively, separately journalled on the shaft $P^2$, and carrying pawls Q' and QA', respectively. The pawls Q' and QA' are so formed and disposed that when the rocker arm Q has its free end moved downward by the member K, to which it is connected by a connecting rod $K^{10}$, the pawl Q' will engage the disk $P^3$ and rotate the latter and thereby the rheostat arm P', in the clockwise direction. Similarly, when the free end of the rocker arm QA is depressed by the member KA through the corresponding connection $K^{10}$, the pawl QA' engages the disk $P^3$ and turns the latter, and thereby the rheostat arm P', in the counterclockwise direction. As shown, the pawls Q' and QA' are provided with cam tails or extensions $Q^2$ and $QA^2$ respectively. When the arm Q' is in its elevated position the tail $Q^2$ of the pawl Q' engages a stop pin $A^6$, and the pawl Q' is thereby held out of engagement with the disk $P^3$. Similarly a stop pin $A^7$ engages the tail $QA^2$ of pawl QA and holds the latter out of engagement with disk $P^3$ when the arm QA is in its elevated position. In consequence, the depression of either rocker arm will permit of a corresponding rotation of the disk $P^3$ without interference by the pawl carried by the other rocker arm which is then in its elevated position. The rheostat P may constitute a potentiometer resistance, thermometer resistance, the current regulating resistance of a Wheatstone bridge, the speed regulating resistance of a relay or other electric motor, or in general, may be any resistance which it is desired to adjust from time to time in a direction, and to a degree dependent on the position into which the selective actuator H is adjusted in response to the then position of the meter pointer B.

A typical example of the uses to which the apparatus shown in Figs. 1 and 2, and the modification thereof shown in Fig. 4, may be employed, is illustrated in Fig. 5. In the arrangement shown in Fig. 5, R' and $R^2$ represent resistances employed to indicate the composition of a gas in a known manner, by the difference in relative thermal conductivities of air or a standard gas surrounding one of the resistors as R' and of the gas of which the composition is to be determined which surrounds the other resistor $R^2$. To this end, the resistors R' and $R^2$ are connected into and form two arms of a Wheatstone bridge, one of the other arms including resistors $R^3$ and $r$, and the fourth including a resistance $R^4$. The resistance $R^4$ is connected between one end of the slide wire resistance S and the end of the resistance $R^2$ remote from the resistance R'. Between the other end of the slide wire resistance S and the end of the resistance R' remote from the resistance $R^2$, the resistances $R^3$ and $r$ are connected in series. A contact S' adjustable along the slide wire resistance S, adjusts the relative resistance of the two bridge arms which include the resistance $R^4$, and the resistances $R^3$ and $r$. The bridge is energized by a source of current Z, connected at one side to the contact S', and connected at the other side to the switch arm P' of a rheostat, the resistance of which is connected at one end by a conductor 11 to the junction between the bridge arms formed by the resistances R' and $R^2$. The circuit arrangement shown in Fig. 5 permits the bridge adjusting slide wire S to be located in proximity to the instrument and not as is usual in proximity to the Wheatstone bridge which must be located adjacent the gas comparison cells in which the resistances R' and $R^2$ are placed.

As shown in Fig. 5, the rheostat arm P' is carried by the slow speed or counter-shaft $O^2$ of the motor O, driven by the armature shaft O' of the motor through speed reducing gearing, though the arm P' might equally well, or better, be mounted on the shaft $P^2$ of the simple meter control rheostat mechanism illustrated in Fig. 4. With the rheostat arm P' connected to either of the meter control shafts $O^2$ or $P^2$ described, the resistance P in circuit may be periodically adjusted as required to secure a bridge energizing current of predetermined magnitude by intermittently using the meter B to measure the potential drop created in a portion of the bridge circuit of fixed resistance. The portion of the bridge circuit thus utilized in Fig. 5, is the resistance $r$, one terminal of the winding of the meter B being connected to the junction between the resistances $r$ and R', while the other terminal of the meter winding is intermittently connected to the other end of the resistance $r$ through circuit connections, including a conductor 8, a movable switch contact Y, a contact W, and a conductor 9. When the contact Y is moved, as hereinafter described, into engagement with the contact W, the meter B measures the potential drop in the resistance $r$ and if that potential drop is greater or less than that produced by the desired strength of the bridge energizing current, the pointer B' will be deflected in the one direction or the other. This will cause the motor O to rotate in the proper direction to increase or decrease the resistance of the rheostat P in the bridge energizing circuit and thus tend to restore the bridge energizing current to its proper value, the motor O and its connections being properly designed to accomplish this result.

The circuit arrangements and mechanism for periodically moving the contact Y into and out of engagement with the contact W shown in Fig. 5, are adapted to permit the meter B to serve as an indicating meter showing the composition of the gas in contact with the resistor R', except during the brief periods in which the contact is in engagement with the contact W. To this end, the contact Y is carried by a lever T pivotally connected at $E^7$ to the lever E between the shaft $A^2$ and the cam engaging lever projection E'. A projection T' from the lever T engages the periphery of the cam e back of the projection E', so that the projection T' enters the cam notch e' shortly before the projection E' enters. Except when received in the cam notch e', projection T' is held by the cam e in the position in which the contact Y is separated from the contact W and is in engagement with a contact U, hereinafter referred to. When the rotation of the cam e brings the notch e' above the projection T', the latter is moved into the notch by the tension of the spring $E^2$, which has its upper end connected to the lever EA as in the construction first described, but in the form shown in Fig. 5, has its lever end connected at $T^2$ to the lever T.

When the projection T' enters the cam notch e', the lever T is turned about its fulcrum $E^7$ and thereby moves the contact Y away from the contact U and into engagement with the contact W. This, as previously described, connects the terminals of the winding of the meter B to the terminals of the resistance r. When very shortly thereafter the projection E' of the lever E enters the cam notch e', the pointer B' is engaged by the depressor and in due course the member H adjusts the switch mechanism controlling the motor O to set the latter into rotation in the proper direction to increase or decrease the meter energizing current through the resultant adjustment of the rheostat arm P', if the position assumed by the meter pointer B' when the contact Y engaged the contact W was such as to require adjustment of the bridge energizing circuit. The time interval between the movement of the contact T' into the cam notch e' and the movement of the projection E' into that notch may be very short, but should, of course, be sufficient to permit the meter pointer B' to assume the proper position.

The tension of the spring $E^2$ should be sufficient to move the projection E' into the cam notch e' when the position of the cam permits. The spring $E^2$ then acts on the lever E through the pivotal connection $E^7$, and the contact W which serves as a fulcrum for the lever T until the end $T^3$ reaches $E^6$, thereafter $T^3$ serves as a fulcrum for T and Y moves from W to U. By locating the shaft $A^2$ between and close to the contacts U and W, small relative movement takes place between the contacts Y and U as the projection $E^5$ enters the cam notch g' and thereby depresses E and T as a unit. Advantageously, however, the shaft $A^2$ may be so positioned that the aforesaid relative movement will cause a slight rubbing action between the contact Y and the contact U as such rubbing action tends to insure clean contact surfaces and good contact.

As soon as the continued movement of the cam e, or the dropping of the weight $E^6$ carries the projection E' out of the cam notch e', the member C releases the meter pointer B', and during the period constituting a large portion of the time required for each revolution of the cam e in which the needle B' is free to swing and the contact Y engages the contact U, the meter B indicates the composition of the gas in contact with the resistor R'. This results from the fact that the contact U previously referred to is connected by the conductor 10 to the junction between the bridge arms formed by the resistors $R^2$ and $R^4$, so that with the contact Y in engagement with the contact U the winding of the meter B is connected to opposed points in the Wheatstone bridge and responds to the difference between the potential drops through the resistors R' and $R^2$.

In Fig. 5 the lever T, contact Y, and contacts U and W, form in effect a single pole switch. By replacing this single pole switch with a double pole switch, as shown in Figs. 6 and 7, it is possible to remove the bridge current calibrating resistance r from the bridge circuit, and locate it adjacent the control instrument. In the arrangement shown in Figs. 6 and 7, the lever T which may be otherwise similar in construction and mounting to the lever T of Fig. 5, is provided with a second contact YA which may be similar to, and is located alongside the contact Y. When the lever T is shifted to bring the contact Y in engagement with the contact U, the contact YA engages contact UA, and when the contact Y is moved into engagement with the contact W, the contact YA engages the contact WA.

In Fig. 6, the junction between the bridge arm resistances $R^2$ and $R^4$ is connected by the conductor 12 to the contact UA. The junction between the resistances R' and $R^3$ is connected by the conductor 13 to the contact U. One terminal of the winding of the meter B is connected by a conductor 8 to the movable contact Y, and the other terminal of the meter winding is connected by the conductor 80 to the movable contact YA. One terminal of the resistance r is connected by a conductor 14 to the contact WA, and the other terminal of the resistance r is connected by the conductor 15 to the contact W. The operation of the apparatus shown in Figs. 6 and 7 is essentially the same as that shown in Fig. 5. When the movable contacts Y and YA engage the upper contacts U and UA, respectively, the meter B indicates the analysis of the gas in contact with the bridge resistor R'. When the movable contacts Y and YA engage the lower contacts W and WA, respectively, the meter B measures the potential drop through the resistance $r$.

While the pointer engaging element C bears obvious resemblances to the pointer depressors of various known forms of a type of control instrument in extensive use, and the mechanism employed for controlling the engagement and disengagement of the element C and the meter pointer B' is well adapted for the control of the depressor of such prior instruments, the element C disclosed herein differs from the depressor of such prior control instruments in the force with which the needle is necessarily engaged. With the present invention the force with which the pointer and pointer engaging element C engage need be only the relatively small force required to arrest the downward movement of the element C which may be nearly counter-balanced and need have little inertia, while in control instruments of the prior type referred to, the contact pressure between the pointer and the depressor must be at least sufficient to insure good electrical contact when the depressor and pointer directly coact to close a control circuit, or must be the somewhat greater force required to close spring separated contacts, or to mechanically adjust clutch elements accordingly as the instrument is one in which the depressor operates through the pointer to control switch contacts or to adjust the clutch mechanism of a mechanical relay. In other words, the present invention is distinguished by the fact that the energization or control of the relay mechanism depends merely upon the position of the pointer engaging element when it contacts with the pointer, rather than upon the force with which said element engages the pointer.

In addition to the small force which it is necessary to put on the delicate meter pointer B', especial attention is directed to other characteristic and important advantages of the apparatus hereinbefore described. The member C and its supporting rock shaft $C^2$ may take very simple forms well adapted to their location inside of, or near to the case for the meter B. By angularly adjusting the member C relative to the shaft $C^2$ about a pivotal connection C' located in line with, or in proximity to the axis of the movable coil B' of the meter, and correspondingly adjusting the member D, if the latter adjustment is necessary, the instrument may be employed to maintain different temperatures or different values of whatever quantity the position of the pointer B' indicates, without any adjustment of the mechanism operated by or through the power shaft F. The invention permits all of the electrical connections, and in particular the contacts of the control system to be located out of proximity to the galvanometer and its pointer.

With the present invention the manner in which the relay is to be energized is selected or determined as soon as the secondary selector H is adjusted and located in its adjusted position, which may be effected in a very brief interval of time following the engagement of the pointer by the element C. As soon as the secondary selector is locked in its new position by the keeper I, the element C may be raised so that the meter pointer need be restrained by the element C only during periodically recurring and very brief intervals. The cycle of operations including the operation of the control mechanism proper, may proceed with comparative slowness throughout the period between each successive pair of time intervals in which the meter pointer is engaged by the element C, and in consequence that cycle of operations can be carried out with positiveness by a relay motor such as an electrical clock of relatively low power. It is particularly to be observed that the tension spring $E^2$ and the weight $E^6$ form instrumentalities through which power is stored up at a relatively slow rate during the major portion of each rotation of the shaft F for effecting a quick and positive action of the lever E at the end of such revolution, and in the form of apparatus shown in Fig. 5, the power thus stored is effective in securing quick action of, and proper contact pressure in the switch mechanism of which the contact Y forms a part.

The apparatus shown diagrammatically in Fig. 5 constitutes exceedingly simple and effective mechanism for periodically recalibrating a Wheatstone bridge or other metering circuit. The fact that the exercise of the control function does not depend upon the contact pressure between the pointer and pointer engaging element C but on the position of the latter, permits the switch members L and LA or analogous elements through which the control function is exercised, to be relatively heavy and positive in their action, so that contacts directly carried by the members L and LA, for example, may be adapted to carry the energizing current of a relatively powerful motor, which with prior control instruments would require the use of intermediate or secondary relay switch mechanism for its control. It is to be further noted that since the pointer B' engages a fixed stop D, and such engagement serves merely to arrest the movement and fix the position of the element C, it is not necessary to impress any frictional resistance overcoming force on the pointer as is the case in an instrument in which the pointer is depressed against a stop which is thereby moved by force transmitted through the pointer.

While in accordance with the provisions of the statutes I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In a control instrument, the combination with a meter pointer, of a relay mechanism controlled by said pointer and comprising a member, means dependent on contact between said member and pointer for periodically adjusting said member into a position dependent at each adjustment on the then position of the pointer, a selector, means operating independently of the force of engagement in said contact but dependent on the position of said first mentioned member for periodically adjusting said selector into positions corresponding respectively, with the positions into which the first mentioned member is periodically adjusted and for maintaining each such adjustment of said selector when said member moves out of its corresponding position of adjustment, and mechanism energized through said selector in selective accordance with the position of the latter.

2. In a control instrument, the combination with a meter pointer, of a member, means dependent on contact between said member and pointer for periodically adjusting said member into a position dependent on the then position of the pointer, a selector, means operating independently of the force of engagement in said contact but dependent on the position of said first mentioned member for periodically adjusting said selector into selective positions corresponding respectively, with the positions into which the first mentioned member is periodically adjusted and for maintaining each such adjustment of said selector when said member moves out of its corresponding position of adjustment, and relay mechanism selectively controlled by the position of said selector.

3. In a control instrument, the combination with a meter pointer, of a relay mechanism controlled by said pointer and comprising a movable pointer engaging element tending to move from a retracted position into engagement with the pointer and having a pointer engaging surface so disposed that the extent of movement of the member from said retracted position into engagement with the pointer will vary with the position of the pointer, means intermittently engaging said member to return it to and hold it in its retracted position and releasing said member to permit it to engage the pointer, a selector, and means including engaging parts associated with said member and selector for setting said selector in a position corresponding to the position of the pointer on each engagement of the latter by said member and for temporarily maintaining each such selector setting when said element moves out of engagement with said pointer.

4. In a control instrument, the combination with a meter pointer, of a relay mechanism controlled by said pointer and comprising a movable pointer engaging element tending to move from a retracted position into engagement with the pointer and having a pointer engaging surface so disposed that the extent of movement of the member from said retracted position into engagement with the pointer will vary with the position of the pointer, means intermittently engaging said member to return it to and hold it in its retracted position and releasing said member to permit it to engage the pointer, a selector, means normally holding said selector in any position assumed by it when previously released and temporarily releasing the selector during each period in which said member engages said pointer, and co-acting means carried by said member and selector for setting said selector in a position corresponding to the position of the pointer on each release of said selector.

5. In a control instrument, the combination with a meter pointer, of a relay mechanism controlled by said pointer, and comprising a rocking element having an arm and tending to move said arm from a retracted position into engagement with the pointer, said arm having a pointer engaging surface so disposed relative to the pointer that the extent of movement of said arm from its retracted position into engagement with the pointer will vary with the position of the pointer, means normally holding said element in its retracted position but periodically releasing it to permit said arm to engage the pointer, a selector, and means including a part of said element but separate from said arm for setting said selector in a position corresponding to the then position of the pointer on each engagement of the latter by said arm and for temporarily maintaining each such selector adjustment while said element moves out of the corresponding engagement with the pointer.

6. In a control instrument, the combination with a meter pointer, of a relay mechanism controlled by the latter and comprising a periodically moving cam, a pair of separately movable control elements, a selector element given a to and fro movement by said cam and adapted to serve as a thrust block between said cam and one or the other of said control elements according to the position occupied by the selector, and means for periodically adjusting said selector into a position corresponding to the then position of said pointer.

7. In a control instrument, the combination with a meter pointer, of a relay mechanism controlled by the latter comprising a selector element, means giving it a to and fro movement, a pair of separately movable control elements, one or the other of which is actuated by said selector according to its position, and means for periodically adjusting said selector into a position corresponding to the then position of said pointer.

8. In a control instrument, the combination with a meter pointer, of a relay mechanism controlled by the latter and comprising a pair of separately movable control elements, a selector, means moving it toward and away from said elements, said selector being adjustable into various positions and serving as a thrust block between said actuator and one or another of said elements dependent on the position of the selector, and means for periodically adjusting said selector into a position corresponding to the then position of the meter pointer.

9. In a control instrument, the combination with a meter pointer, of a relay mechanism controlled by the latter and comprising a pair of separately movable control elements, a selector, means moving it toward and away from said members, said selector being adjustable into various positions and serving as a thrust block between said actuator and one or another of said elements dependent on the position of the selector, means for periodically adjusting said selector into a position corresponding to the then position of the meter pointer, and means for temporarily securing said selector in each position into which it is adjusted.

10. In a control instrument, the combination of a meter pointer, a selector, means for giving said selector a to and fro movement, a pair of separately movable control elements one or the other of which is engaged and moved by said selector on each movement of the selector when the latter is set at one side or the other of an intermediate position, and means dependent on the position of the meter pointer for setting said selector into a position corresponding to the position of said pointer.

11. In a control instrument, the combination of a meter pointer, a selector, means for giving said selector a to and fro movement, a pair of separately movable control elements one or the other of which is engaged and moved by said selector on each movement of the selector when the latter is set at one side or the other of an intermediate position, means dependent on the position of the meter pointer for setting said selector into a position corresponding to the position of said pointer said selector and elements having engaging surfaces so shaped that the magnitude of movement given each element when engaged by the selector varies with the distance of the latter from its intermediate position.

12. In a control instrument, the combination of a meter pointer, a selector, means for giving said selector a to and fro movement, a pair of separately movable control elements one or the other of which is engaged and moved by said selector on each movement of the selector when the latter is set at one side or the other of an intermediate position, means dependent on the position of the meter pointer for setting said selector into a position corresponding to the position of said pointer, a movable lock normally engaging said selector and holding the latter in any position into which it is set, and means temporarily interrupting the engagement between said lock and selector during the periods in which said selector is being reset.

13. In a control instrument, the combination of a meter pointer, a selector, means for giving said selector a to and fro movement, a pair of separately movable control elements one or the other of which is engaged and moved by said selector on each movement of the selector when the latter is set at one side or the other of an intermediate position, means dependent on the position of the meter pointer for setting said selector into a position corresponding to the position of said pointer, said means comprising a normally retracted selector stop, and means for periodically advancing said stop into a position corresponding to the then position of said pointer.

14. In a control instrument, the combination of a meter pointer, a selector, means for giving said selector a to and fro movement, a pair of separately movable control elements one or the other of which is engaged and moved by said selector on each movement of the selector when the latter is set at one side or the other of an intermediate position, means dependent on the position of the meter pointer for setting said selector into a position corresponding to the position of said pointer, said means comprising a normally retracted selector stop, means for periodically advancing said stop into a position corresponding to the then position of said pointer, a movable lock normally engaging said selector and holding the latter in any position into which it is set, and means temporarily interrupting the engagement between said lock and selector when said stop is advanced.

15. In a control instrument, the combination with a meter pointer, of a pointer engaging element, a cam having a periodical movement and normally holding said engaging element out of contact with the pointer but periodically releasing said element to permit such contact, a second cam operating in timed relation with the first cam, a selector given a to and fro movement by said second cam, means operatively connected to said pointer engaging element for setting said selector in a position corresponding to the then position of the pointer on each engagement of said element with the latter, a keeper normally engaging said selector and securing it in any position in which it may be set, and means controlled by the first mentioned cam for temporarily interrupting the engagement between said keeper and selector during the period in which the latter is being reset.

16. In a control instrument, the combination with a meter pointer, of a pointer engaging element, and mechanism controlling the engagement of said element with said pointer comprising a member movable from one position in which it holds said element out of contact with the pointer into a second position in which said element is free to contact with said pointer, a second member, a spring connection between the members tending when under tension to move the first mentioned member into said second position, and means normally holding the first mentioned member in said one position but periodically releasing the latter and operating on said second member to put said spring under tension before the first member is released and to release the spring tension shortly after the first mentioned member is released.

17. In a control instrument, the combination with a meter pointer, of a pointer engaging element and mechanism controlling the engagement of said element with said pointer comprising a member, cam means normally holding said member in a position in which it engages said element and holds the latter out of contact with the pointer but periodically releasing said member, a second member, a tension spring connecting said members, cam means normally holding said second member in a position in which said spring gives the first mentioned member a tendency to move in the direction to release said element but permitting said second member to move to diminish the tension on said spring shortly after the first mentioned member releases said element.

18. In a control instrument, the combination with a meter pointer, of a pointer engaging element, and mechanism controlling the engagement of said element with said pointer comprising a member movable from one position in which it holds said element out of contact with the pointer into a second position in which said element is free to contact with said pointer, a weight normally retracted but adapted when released to engage said member and return the latter from said second position to said one position, and means normally holding said member in said one position but periodically releasing the latter and normally holding said weight in its retracted position but periodically releasing the weight shortly after releasing said member.

19. In a control instrument, the combination with a meter pointer, of a pointer engaging element, mechanism controlling the engagement of said element with said pointer comprising a member movable from one position in which it holds said element out of contact with the pointer into a second position in which said element is free to contact with said pointer, a selector, a keeper normally engaging said selector and holding it in a position in which it has been previously set, said element comprising means for setting said selector into a position corresponding to that of the pointer when said selector is released and said element engages said pointer, means carried by said member for holding said keeper out of engagement with said selector when said member is in said second position, and actuating means normally holding said member in said one position but periodically releasing the latter.

20. In a control instrument, the combination with a meter pointer of a pointer engaging element, mechanism controlling the engagement of said element with said pointer comprising a member movable from one position in which it holds said element out of contact with the pointer into a second position in which said element is free to contact with said pointer, a selector, a keeper normally engaging said selector and holding it in a position in which it was previously set, said element comprising means for setting said selector into a position corresponding to that of the pointer when said selector is released and said element engages said pointer, means carried by said member for holding said keeper out of engagement with said selector when said member is in said second position, actuating means normally holding said member in said one position but periodically releasing the latter, and giving said selector a to and fro movement in timed relation with the release of said member, and control means actuated by the to and fro movement of said selector in a manner dependent on the setting of the latter.

21. In a control instrument, the combination with a meter pointer, of a selector, means for periodically setting said selector into a position corresponding to the then position of said pointer, a pair of separately movable control elements, means acting through said selector to periodically engage one or the other of said control members depending on the position of said selector, and a pair of switch contacts adjusted with a snap action one by one and the other by the second of said members when the latter are engaged and moved by said selector.

22. In a control instrument, the combination with a meter pointer, of a selector, means for periodically adjusting said selector into a position corresponding to the then position of said pointer, a pair of control elements separately movable each out of a normal position which it tends to assume, a pair of snap action switch members actuated one by one and the other by the second of said control members as said control members are moved out of and returned to their normal positions, and means for periodically giving said selector a to and fro movement to thereby move one or the other of said control members out of its normal position according to the position in which the selector has been previously set.

23. In a control instrument, the combination with a meter pointer, of a selector, means for periodically adjusting said selector into a position corresponding to the then position of said pointer, a pair of control elements separately movable each out of a normal position which it tends to assume, a pair of snap action switch members actuated one by one and the other by the second of said control members as said control members are moved out of and returned to their normal positions, and means for periodically giving said selector a to and fro movement to thereby move one or the other of said control members out of its normal position according to the position in which the selector has been previously set, said selector and control members having engaging parts so shaped that the contact member actuating movement of each control member will occur early or late in the periodical movement of the selector effecting such movement, accordingly as the selector is displaced more or less from a neutral position.

24. In a control instrument, the combination with a meter pointer, of a selector, means for periodically setting said selector into a position corresponding to the then position of said pointer, a pair of snap action switch members, and means acting through said selector to periodically actuate one or the other of said switch members depending on the position of said selector.

25. In a control instrument, the combination with a meter pointer, of a selector, means periodically adjusting said selector into a position corresponding to the then position of said pointer, a pair of control elements separately movable each out of a normal position which it tends to assume, a pair of movable switch members actuated one by one and the other by the second of said control members, a resilient connection between each control member and the corresponding switch contact member whereby each switch member is adjusted with a snap action between two positions accordingly as the corresponding control member is moved out of or returned to its normal position, and means controlled by said selector for periodically moving out of its normal position one or the other of said control members according to the position in which the selector has been previously set.

26. In a control instrument, the combination with a meter pointer, of a selector, means periodically adjusting said selector into a position corresponding to the then position of said pointer, a pair of control elements separately movable each out of a normal position which it tends to assume, a pair of movable switch members actuated one by one and the other by the second of said control members, a resilient connection between each control member and the corresponding switch contact member whereby each switch member is adjusted with a snap action between two positions accordingly as the corresponding control member is moved out of or returned to its normal position, means cooperating with said selector for periodically moving out of its normal position one or the other of said control members according to the position in which the selector has been previously set, and relay energizing means including contacts carried by said switch members for effecting relay energization in one direction or the other accordingly as one or the other of said control elements is moved out of its normal position while the other control element remains in its normal position.

27. In a control instrument, the combination with a meter pointer, of a selector, means periodically adjusting said selector into a position corresponding to the then position of said pointer, a pair of control elements separately movable each out of a normal position which it tends to assume, a pair of movable switch members actuated one by one and the other by the second of said control members, a resilient connection between each control member and the corresponding switch contact member whereby each switch member is adjusted with a snap action between two positions accordingly as the corresponding control member is moved out of or returned to its normal position, means cooperating with said selector for periodically moving out of its normal position one or the other of said control members according to the position in which the selector has been previously set, and relay energizing means including contacts carried by said switch members for effecting relay energization in one direction or the other accordingly as one or the other of said control elements is moved out of its normal position while the other control element remains in its normal position and for preventing relay energization in case the two control members are simultaneously moved out of their normal positions.

28. The combination with a meter having a swinging pointer, of mechanism for alternately connecting said meter to a measuring circuit and to a circuit for calibrating the first mentioned circuit comprising a pointer engaging element, a member movable from one position in which it holds said element out of contact with the pointer into a second position in which said element is free to contact with said pointer, a contact movably mounted on said member, means periodically moving said member back and forth between its first and second positions and giving said contact movements relative to said member first in one direction and then in the opposite direction in synchronism, but out of phase with the movements given to said member, and measuring circuit adjusting means controlled by the position of said pointer when engaged by said element.

29. In a control instrument, the combination with a meter pointer, of a selector, means for periodically adjusting said selector into a position corresponding to the then position of said pointer, a pair of separately movable control elements, means for periodically giving said selector a to and fro movement to thereby actuate one or the other control element accordingly as said selector has previously been adjusted into a position at one side or the other of an intermediate position, said selector and control elements having engaging parts so shaped that its actuation by the selector will occur early or late in the periodical movement of the selector producing such actuation, accordingly as the selector is then displaced more or less from said intermediate position.

30. The combination with a deflecting meter element, of a cooperating element periodically movable transversely of the plane of deflection of the first mentioned element into engagement with the latter, said elements having engaging surfaces, one of which includes portions displaced from one another in a direction transverse to said plane whereby the position of said second element on engagement with the first mentioned element depends upon the deflection of the latter, and means selectively controlled by the position of said second element at the time of such engagement for exerting an effect varying in direction and magnitude accordingly as one or another of said portions is then engaged by the other of said surfaces.

31. The combination with a deflecting meter element, of a cooperating element periodically movable transversely of the plane of deflection of the first mentioned element into engagement with the latter, said elements having engaging surfaces, one of which is inclined to said plane whereby the position of said second element on engagement with the first mentioned element depends upon the deflection of the latter, a selector movable independently of said element, adjusting means adjusting said selector into a position selectively dependent on the portion of said inclined surface in engagement with said other surface on each engagement of said surfaces and maintaining said selector adjustment when said surfaces thereafter separate and means controlled by the adjustments of said selector for exerting control effects selectively dependent on said adjustments.

32. The combination with a deflecting meter element, of a cooperating element periodically movable transversely of the plane of deflection of the first mentioned element into engagement with the latter, said elements having engaging surfaces, one of which is inclined to said plane whereby the position of said second element on engagement with the first mentioned element depends upon the deflection of the latter, and means selectively controlled by the position of said second element at the time of such engagement for exerting an effect varying in direction and magnitude according to the portion of said inclined surface then engaged by the other of said surfaces.

33. In a control instrument, the combination with a deflecting meter element, of a member periodically movable transversely to the plane of deflection of said element toward the latter until such movement is arrested by the engagement of said member and element, said element and member having engaging surfaces, one of which is inclined to said plane whereby the position of said member, when its movement is arrested by engagement with said element, depends upon the then deflection of said element and control means dependent upon the position of said member and selectively energized to create one or the other of two opposing effects when each such movement is arrested accordingly as said deflecting element is then at one side or the other of a neutral position relative to said member and each varying in magnitude according to the displacement of said pointer from said neutral position.

34. In a control instrument, the combination with a galvanometer pointer, of a single movable contactor element adapted to engage said pointer at different elevations dependent on the position of the pointer, and cooperating means for producing one or another of opposing control effects accordingly as said pointer is at one side or the other of a neutral position relative to said element and each varying in magnitude with the displacement from said neutral point of the point of pointer and element engagement.

35. In a control instrument, the combination with a delicate galvanometer pointer, of a movable pointer contacting element having a sloping pointer engaging surface, and cooperating means for producing one or another of opposing control effects accordingly as pointer and element engage at one side or the other of a neutral point of said element and each varying in magnitude with the displacement from said neutral point of the point of pointer and element engagement.

36. In a control instrument, the combination with a meter pointer, of a relay mechanism controlled by said pointer and comprising a movable pointer engaging member movable between a retracted position and a position of engagement with the pointer, the latter and said member having engaging surfaces one of which is so disposed that the extent of movement of the member from said retracted position into engagement with the pointer will vary with the deflection of the pointer, means periodically subjecting said member to a force effective to move it into engagement with the pointer and yielding to permit the pointer to arrest the movement of said member on such engagement, said means thereafter subjecting said member to a force returning the latter to its retracted position, a selector and means controlled by said member for setting said selector into a position corresponding to the position of the pointer on each engagement of the latter by said member and means maintaining the setting of said selector during the following return movement of said member.

37. In a control instrument, the combination with a meter pointer, of a relay mechanism controlled by said pointer and comprising a movable pointer engaging member movable between a retracted position and a position of engagement with the pointer, the latter and said member having engaging surfaces one of which is so disposed that the extent of movement of the member from said retracted position into engagement with the pointer will vary with the deflection of the pointer, means periodically subjecting said member to a gravital force effective to move it into engagement with the pointer and for thereafter subjecting said member to a force returning the latter to its retracted position, a selector and means carried by said member and selector for setting said selector into a position corresponding to the position of the pointer on each engagement of the latter by said member and means maintaining the setting of said selector during the following return movement of said member.

38. In a control instrument, the combination with a meter pointer, of a relay mechanism controlled by said pointer and comprising a movable pointer engaging member movable between a retracted position and a position of engagement with the pointer and subjected to a yielding force tending to move it into the last mentioned position, the pointer and said member having engaging surfaces one of which is so disposed that the extent of movement of the member from said retracted position into engagement with the pointer will vary with the deflection of the pointer, means for intermittently subjecting said member to a force overbalancing the first mentioned force, a selector and means controlled by said member for setting said selector into a position corresponding to the position of the pointer on each engagement of the latter by said member and means maintaining the setting of said selector during the following return movement of said member.

39. In a control instrument the combination with a deflecting meter element, of a member having an element engaging part movable between a retracted position in which said part is at one side of the plane of movement of said element into a second position in which said part is at the opposite side of said plane, the completion of such movement being permitted or prevented by said element according to the position of the latter, means periodically effecting movements of said member into and out of said retracted position, and a mechanical relay mechanism controlled by said member, and including a selector relay controller adjusted by said member into one or another position accordingly as said member is permitted or prevented by said element from moving into said second position and means temporarily maintaining the adjustment of said controller effected following each movement of said member out of its retracted position while said member is thereafter returned to said retracted position.

40. In a control instrument, the combination with a deflecting meter element, of a relay mechanism controlled by said element and comprising a movable member having an element engaging part and tending to move from a retracted position in which said part is at one side of the plane of movement of said element into a second position in which said part is at the opposite side of said plane, the completion of such movement being permitted or prevented by said element according to the position of the latter, means alternately holding said member in said retracted position and releasing it to permit said movement, and a relay controlling selector adjusted by said member into one or another position accordingly as said member moves into, or is prevented by said element from moving into said second position and means temporarily maintaining the adjustment of said selector effected following each movement of said member out of its retracted position while said member is thereafter returned to said retracted position.

41. In a control instrument, the combination with a deflecting meter element of a movable member having an element engaging part and tending to move from a retracted position in which said part is at one side of the plane of movement of said element into a second position in which said part is at the opposite side of said plane, the completion of such movement being permitted or prevented by said element according to the position of the latter, a mechanical relay mechanism controlled by said member and including a selector movable independently of said member and normally engaging said member and tending to move to preserve said engagement as said member moves towards said second position and thereby exerting a yielding force on said member opposing the movement of the latter toward said second position.

42. In a control instrument, the combination with a deflecting meter element, of a movable member having an element engaging part and tending to move from a retracted position in which said part is at one side of the plane of movement of said element into a second position in which said part is at the opposite side of said plane, the completion of such movement being permitted or prevented by said element according to the position of the latter, and a mechanical relay mechanism controlled by said member and including a selector relay controller movable independently of said member and normally engaging said member and tending to move to preserve said engagement as said member moves towards said second position and thereby exerting a yielding force on said member opposing the movement of the latter toward said second position, said relay comprising means temporarily locking said selector in the position assumed by it when said member reaches said second position or has its movement arrested by said element.

43. In a control instrument, the combination with a meter pointer, of a relay mechanism controlled by said pointer and comprising a periodically moving power actuated element, a selector member pivotally connected to said element and thereby given to and fro movements along one or another of two paths, a pair of control elements selectively actuated by said member accordingly as the latter moves along one or the other of said paths and means controlled by the position of said pointer for causing said selector to move along one or the other of said paths according to the deflection of said pointer.

Signed at Philadelphia, in the county of Philadelphia, and State of Pennsylvania, this 10th day of November, A. D. 1925.

THOMAS RANDOLPH HARRISON.